United States Patent
Hara et al.

(10) Patent No.: US 8,654,406 B2
(45) Date of Patent: Feb. 18, 2014

(54) IMAGE READING APPARATUS WITH A TRANSPARENT MEMBER BIASED BY A POSITIONING MEMBER

(75) Inventors: Koji Hara, Nagano-ken (JP); Tetsuya Miyagawa, Nagano-ken (JP); Naomi Kimura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 279 days.

(21) Appl. No.: 13/250,401

(22) Filed: Sep. 30, 2011

(65) Prior Publication Data

US 2012/0086988 A1 Apr. 12, 2012

(30) Foreign Application Priority Data

Oct. 6, 2010 (JP) ................... 2010-226647

(51) Int. Cl.
*H04N 1/04* (2006.01)
*H04N 1/21* (2006.01)
*G03G 15/04* (2006.01)
*G03G 15/00* (2006.01)

(52) U.S. Cl.
USPC .............. 358/296; 399/95; 399/213; 358/496

(58) Field of Classification Search
USPC ...................... 358/296; 399/95, 213
See application file for complete search history.

(56) References Cited

U.S. PATENT DOCUMENTS

2007/0206239 A1* 9/2007 Huang et al. .................. 358/496

FOREIGN PATENT DOCUMENTS

JP    11-298685    10/1999

* cited by examiner

*Primary Examiner* — Barbara Reinier (57) ABSTRACT

An image reading apparatus which reads an image on a target includes a first housing, a transparent member which is provided on the first housing and has a placement face on which the target is placed, a positioning member on which the transparent member is placed, a second housing which is assembled on the first housing and biases the positioning member, and an engagement member which is provided on the second housing and engages with the positioning member. In the image reading apparatus, when the second housing is assembled on the first housing, the engagement member biases the positioning member so as to fix the transparent member to an attachment position.

9 Claims, 6 Drawing Sheets

IMAGE READING APPARATUS WITH A TRANSPARENT MEMBER BIASED BY A POSITIONING MEMBER

CROSS REFERENCES TO RELATED APPLICATIONS

The entire disclosure of Japanese Patent Application No: 2010-226647, filed Oct. 6, 2010, is expressly incorporated by reference herein.

BACKGROUND

1. Technical Field

The present invention relates to an image reading apparatus, in particular, relates to a housing configuration of the image reading apparatus.

2. Related Art

There has been an existing scanner as an example of an image reading apparatus. The scanner is configured to read an image of a target through a glass plate by placing the target, for example, a document on a placement face (document table) of a transparent member (for example, glass plate) attached to a housing (case) and making an image reading unit such as a line sensor move (scan).

Accordingly, in order to read the image of the target accurately, the glass plate is required to be attached to the case firmly such that the target is not moved, that is, the glass plate on which the target is placed is not moved. As such attachment method, a method of attaching the glass plate to the case using an adhesive tape (double-stick adhesive tape) has been generally employed.

However, in an operation in which the glass plate is attached (fixed) to the case by the adhesive tape, for example, troublesome operations of bonding the adhesive tape to a specified position and peeling a protection tape are required. Further, when the glass plate or the like is damaged, the glass plate bonded by the adhesive tape is not easily peeled from the case. Therefore, in such case, the whole case is replaced in some case. This arises a problem that total manufacturing cost is increased. In order to solve the problem, a technique in which the glass plate is attached without using the adhesive tape has been proposed. For example, in JP-A-11-298685, a technique of attaching a glass plate to a case by biasing the glass plate in the direction (horizontal direction) along a placement face thereof using a biasing force by a biasing unit (coil spring or the like) has been disclosed.

However, in the attachment method described in JP-A-11-298685, the glass plate is inserted to and is engaged with a supporting portion located at the opposite side to the biasing unit. Therefore, the glass plate is required to be once slid in the direction against the biasing force by the biasing unit (that is, counter-insertion direction). To be more specific, the glass plate is required to be once slid by a predetermined amount corresponding to an engagement amount of the glass plate with the supporting portion along the insertion direction. Accordingly, the biasing force by the biasing unit is required to be set to such moving length that an operator who attaches the glass plate can slide the glass plate by a predetermined amount. Therefore, the biasing force by the biasing unit, which acts on the glass plate, cannot be made larger much in a state where the glass plate is inserted to and attached to the supporting portion. As a result, the biasing force acting on the attached glass plate, that is, a force of fixing the glass plate is not sufficient for practical use.

SUMMARY

An advantage of some aspects of the invention is to provide an image reading apparatus in which a transparent member can be easily attached to a housing and a force of fixing the transparent member is sufficiently applied thereto.

An image reading apparatus according to an aspect of the invention includes a transparent member which is attached between a first housing and a second housing which is assembled on the first housing and has a placement face on which a target is placed, and an image reading unit which reads an image of the target through the transparent member. In the image reading apparatus, a positioning member which is capable of being displaced in a direction along the placement face of the transparent member and determines an attachment position of the transparent member to the first housing when the transparent member is attached by biasing the transparent member while being displaced is provided on the first housing, and an engagement member which displaces the positioning member while engaging with the positioning member when the second housing is assembled on the first housing and biases the transparent member in the direction along the placement face is provided on the second housing.

With this configuration, when the second housing is assembled on the first housing, the positioning member engages with the engagement member to be displaced. With this, the positioning member strongly biases the transparent member in the direction along the placement face thereof so as to position the transparent member. Therefore, the transparent member is not required to be biased and positioned on the first housing before the second housing is assembled. Accordingly, the transparent member can be easily attached to the first housing. Further, even if the biasing force is not generated by the positioning member before the second housing is assembled, a large biasing force can be generated at the time of the positioning by displacing the positioning member. As a result, an image reading apparatus in which the transparent member is easily attached and a fixing force is sufficiently applied thereto can be provided.

In the image reading apparatus according to another aspect of the invention, it is preferable that the positioning member bias the transparent member with a first biasing force before the second housing is assembled on the first housing, and the positioning member bias the transparent member with a second biasing force which is larger than the first biasing force by the displacement when the positioning member engages with the engagement member after the second housing has been assembled on the first housing.

With this configuration, in a state before the second housing is assembled on the first housing, the transparent member is positioned in the direction along the placement face with the first biasing force of the displaced positioning member. On the other hand, in a state after the second housing has been assembled on the first housing, the positioning member which has engaged with the engagement member and has been displaced biases the transparent member in the direction along the placement face with the second biasing force which is larger than the first biasing force. Therefore, the transparent member can be stably positioned. That is to say, if the first housing is assembled on the second housing, the positioning member biases the transparent member further strongly so as to position the transparent member. As a result, even in a state where a biasing force (fixing force) acting on the transparent member which has been positioned by the positioning member is small before the second housing is assembled, the positioning member can bias the transparent member to the side of the supporting member strongly with the assembling of the second housing. Accordingly, an image reading apparatus in which the transparent member is easily attached to the housing and a fixing force is sufficiently applied thereto can be provided.

In the image reading apparatus according to another aspect of the invention, it is preferable that an assembling direction of the second housing on the first housing be perpendicular to the direction along the placement face, the positioning member have a hook-shaped portion which projects in the assembling direction of the second housing from the side of the first housing and generates a biasing force in accordance with a displacement amount in the direction along the placement face, the engagement member have a slope-shaped portion which is inclined in the direction perpendicular to the direction along the placement face, and the positioning member be displaced in the direction along the placement face while the hook-shaped portion abuts against the slope-shaped portion so as to bias the transparent member when the second housing is assembled on the first housing.

With this configuration, the positioning member biases the transparent member with the biasing force in accordance with a displacement amount of the hook-shaped portion. Accordingly, the hook-shaped portion is displaced if the second housing is assembled on the first housing so that the transparent member can be biased further strongly in accordance with the displacement amount so as to be positioned.

In the image reading apparatus according to another aspect of the invention, it is preferable that the transparent member have a rectangular shape, and the positioning member be provided so as to bias two sides of the rectangular shape, which are adjacent to each other, in a direction along two opposed sides which are adjacent to each other.

With this configuration, the transparent member having the rectangular shape can be reliably positioned in the direction along the placement face by the positioning member.

In the image reading apparatus according to another aspect of the invention, it is preferable that the positioning member be formed to be integrated with the first housing.

With this configuration, the position of the positioning member provided on the first housing is suppressed from being varied. In other words, relative positional deviation of the positioning member with respect to the engagement member which is provided on the second housing to be assembled on the first housing is suppressed. Accordingly, a displacement amount of the positioning member which is displaced by the engagement member is suppressed from being varied. This makes it possible to bias the transparent member with a stable biasing force.

BRIEF DESCRIPTION OF THE DRAWINGS

The invention will be described with reference to the accompanying drawings, wherein like numbers reference like elements.

FIGS. 6A and 6B are variations in which a positioning member is formed to be separated from the upper case.

DESCRIPTION OF EXEMPLARY EMBODIMENTS

First Embodiment

Hereinafter, an embodiment in which the invention is embodied in a scanner as an example of an image reading apparatus is described with reference to FIG. 1 through FIG. 5B. It is to be noted that "front-rear direction", "up-down direction" and "right-left direction" used in the following description indicate "front-rear direction", "up-down direction" and "right-left direction" indicated by arrows in each of the drawings, respectively, unless otherwise specified. Further, in this case, the "up-down direction" corresponds to a vertical direction, the "right-left direction" corresponds to a direction in which an image reading unit (line sensor) constituting the scanner moves, and the "front-rear direction" corresponds to a reading width direction of the image reading unit (line sensor).

Figure 1:
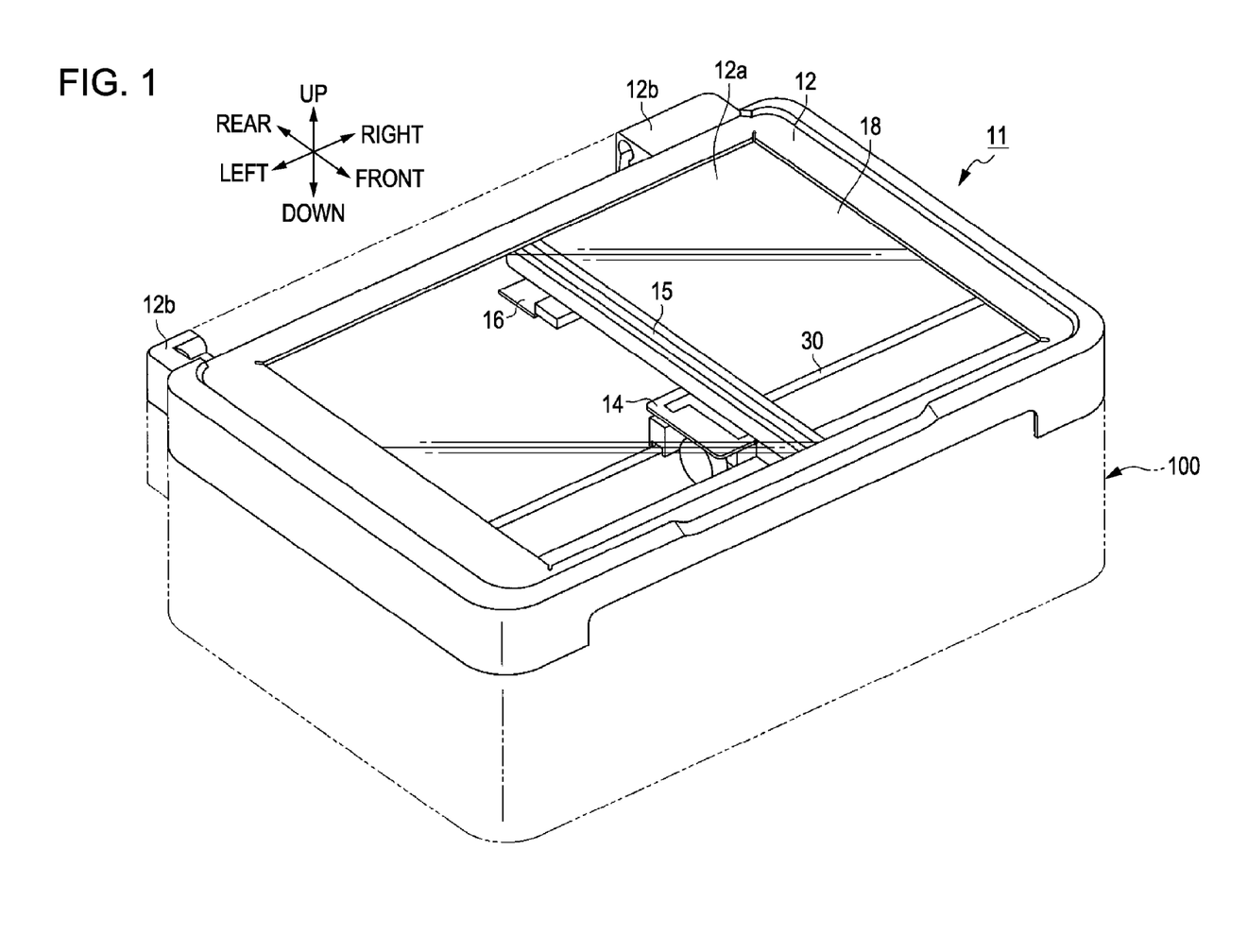
FIG. 1 is a perspective view illustrating external appearance of a scanner according to an embodiment of the invention.

As illustrated in FIG. 1, a scanner 11 includes an upper case 12 as a first housing, and a lower case 13 (see, FIG. 2) as a second housing. The upper case 12 forms an outer frame of the scanner 11 and has a substantially rectangular box shape. The lower case 13 is assembled on the upper case 12 from the inner lower side. An opening 12a having a rectangular shape is provided on the upper case 12. The rectangular shape corresponds to a shape of a region on which a document as an example of a target of which image is read is placed. Further, a glass plate 18 as a transparent member is attached to the opening 12a from the lower side (gravity force direction side). The glass plate 18 has a substantially rectangular shape having an area larger than the opening 12a. An upper face region of the glass plate 18, which is exposed from the opening 12a, serves as a placement face on which the document (target) is placed. Further, the glass plate 18 is fixed between the upper case 12 and the lower case 13 in a state of being biased in the direction along the placement face (that is, front-rear and right-left directions). It is to be noted that a fixing configuration of the glass plate 18 will be described later in detail.

Figure 2:
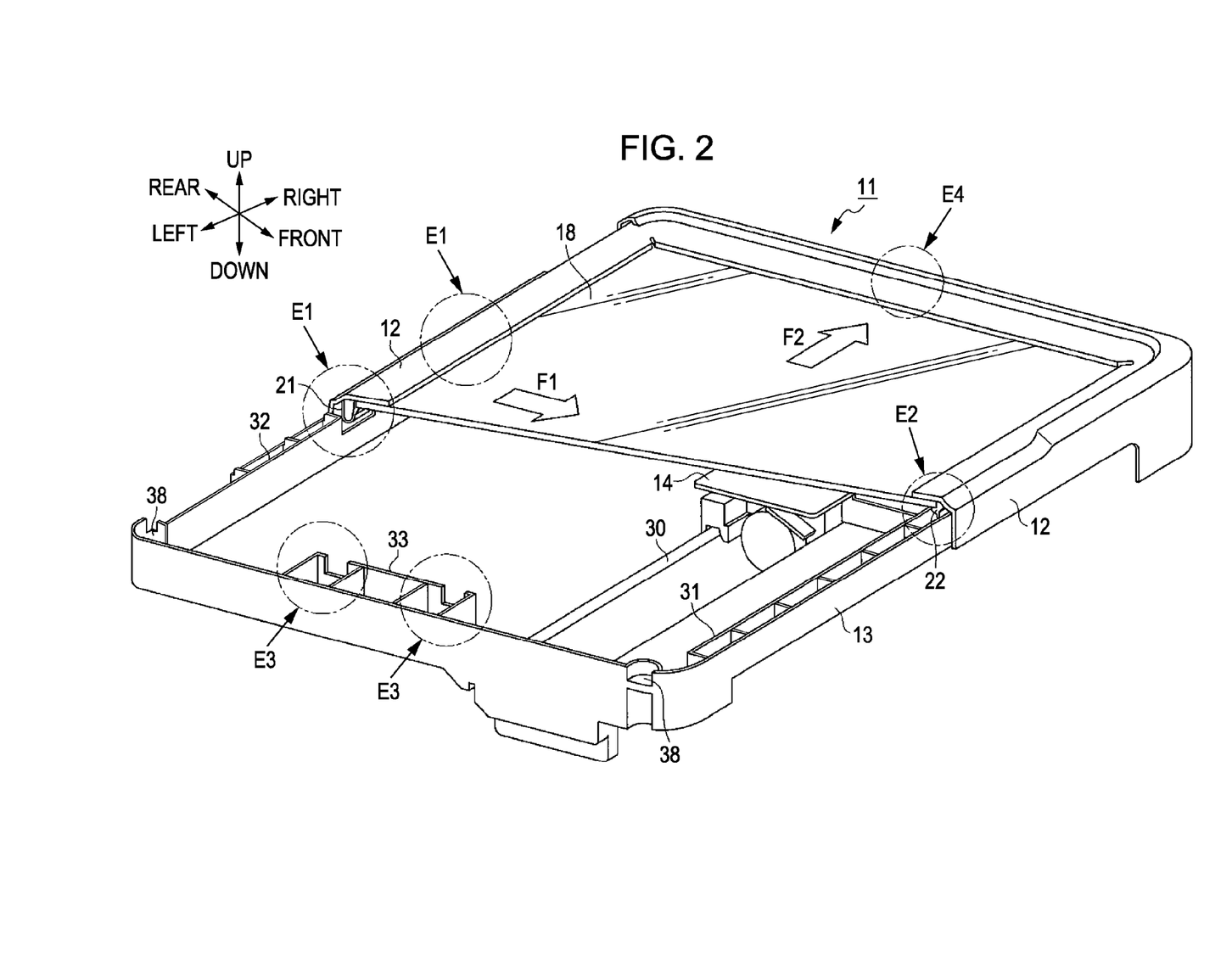
FIG. 2 is a perspective view illustrating a fixing configuration of a glass plate in the scanner according to the embodiment.

In the state where the upper case 12 and the lower case 13 are assembled, a line sensor 15 as an image reading unit having an optical sensor, a lens, and the like is arranged in a space region formed between the upper case 12 and the lower case 13. The line sensor 15 is arranged so as to extend along the front-rear direction by a predetermined length. Further, the line sensor 15 reads an image on the document placed on the glass plate 18 through the glass plate 18. That is to say, the line sensor 15 is moved in the right-left direction by a driving unit 14 so as to scan an image range of the target to be read on the document. The driving unit 14 moves along a guide rail 30 which is provided on the lower case 13 so as to extend in the right-left direction. Image data read by the line sensor 15 by the scanning is output from the scanner 11 through a circuit substrate 16 and a connection substrate (not illustrated). The circuit substrate 16 has an interface circuit between the driving unit 14 and the line sensor 15, and the like. The connection substrate is connected to the circuit substrate 16.

It is to be noted that hinge portions 12b are provided on the scanner 11 according to the embodiment at both sides in the right-left direction. The hinge portions 12b are provided at the rear side of the upper case 12 and rotational shaft holes are provided on the hinge portions 12b. The scanner 11 can be attached to an upper portion of a printer 100 as indicated by a two-dot chain line in FIG. 1, for example, in a rotatable manner by the hinge portions 12b. The image data output from the scanner 11 is supplied to the printer 100 so that the image data can be printed on a paper or the like.

Next, the fixing configuration of the glass plate 18 in the scanner 11 according to the embodiment is described with reference to FIG. 2. It is to be noted that in FIG. 2, a state where the upper case 12 and the glass plate 18 are cut and a part thereof (left portion in this example) is removed is illustrated for description.

As illustrated in FIG. 2, positioning members 21 having hook shapes are formed on the upper case 12 at the rear side. To be more specific, the positioning members 21 are formed at two regions as indicated by arrows E1. The positioning members 21 are formed to be integrated with the upper case 12. Further, a supporting member 22 of which cross sectional shape in the right-left direction is a substantially L shape is formed at a region as indicated by an arrow E2 at the front side. The supporting member 22 is also formed to be integrated with the upper case 12. When the lower case 13 is assembled on the upper case 12, the positioning members 21 bias the glass plate 18 with a biasing force F1 in the direction along the placement face thereof (front direction in this example). As a result, the glass plate 18 is pressed against the side of the supporting member 22 so as to be positioned in the front-rear direction.

In the same manner, positioning members 23 (see, FIG. 3) having hook shapes which are substantially the same as the shapes of the positioning members 21 formed at the regions as indicated by the arrows E1 are formed on the upper case 12 at the left side. To be more specific, the positioning members 23 are formed at two regions as indicated by arrows E3. The positioning members 23 are formed to be integrated with the upper case 12. Further, a supporting member 24 (see, FIG. 3) of which cross sectional shape in the front-rear direction is a substantially L shape which is substantially the same as the shape of the supporting member 22 formed at the region as indicated by the arrow E2 is formed at a region as indicated by an arrow E4 at the right side. The supporting member 24 is also formed to be integrated with the upper case 12. When the lower case 13 is assembled on the upper case 12, the positioning members 23 bias the glass plate 18 with a biasing force F2 in the direction along the placement face thereof (right direction in this example). As a result, the glass plate 18 is pressed against the side of the supporting member 24 so as to be positioned in the right-left direction. In this manner, the glass plate 18 is pressed against the sides of the supporting members 22, 24 by the biasing forces F1, F2 in both directions of the front-rear direction and the right-left direction by the positioning members 21, 23, respectively. Note that the front-rear direction and the right-left direction are directions along the placement face of the glass plate 18 and the positioning member 21, 23 are provided on the upper case 12 at two sides of the opening 12a having a rectangular shape, which are adjacent to each other. With this, the glass plate 18 is positioned and fixed.

On the other hand, the glass plate 18 is fixed in the up-down direction in the following manner. That is, boss engagement portions 38 provided on the lower case 13 and fixing bosses 28 (see, FIG. 3) provided on the upper case 12 are fixed by screws or the like so that the lower case 13 sandwiching the glass plate 18 between the lower case 13 and the upper case 12 is assembled on the upper case 12. With this, the glass plate 18 is fixed in the up-down direction. That is to say, ribs 31, 32, 33 abut against a lower face of the glass plate 18 when the lower case 13 is assembled on the upper case 12 so that the glass plate 18 is pressed against the side of the upper case 12. At this time, the ribs 31, 32, 33 abut against the lower face of the glass plate 18 in the vicinity of ends of sides of the glass plate 18 having the rectangular shape. Note that the ribs 31, 32, 33 are formed on sides of the lower case 13 in a wall-form in the up-down direction. As a result, the glass plate 18 is sandwiched by the upper case 12 at the upper face (placement face) side thereof and the ribs 31 to 33 of the lower case 13 at the lower face side thereof. Therefore, the glass plate 18 is positioned and fixed in the up-down direction. It is to be noted that the right-left direction of the glass plate 18 corresponds to a lengthwise direction of the rectangular shape. The ribs 31, 32 which are provided so as to extend in the right-left direction are formed to be longer than the rib 33 which is provided so as to extend in the short-side direction (front-rear direction) intersecting with the lengthwise direction. Therefore, the glass plate 18 which is easy to deflect in the lengthwise direction is reliably fixed.

In the scanner 11 according to the embodiment, after the glass plate 18 has been attached to the upper case 12 in a state where movements thereof in the front-rear and right-left directions and movement thereof in the up-down direction are restricted, the glass plate 18 is positioned and fixed between the upper case 12 and the lower case 13 in a state as illustrated in FIG. 2. The former state is referred to as a temporal fixing state because the glass plate is not firmly fixed to the upper case 12. On the other hand, the latter state is referred to as a permanent fixing state because the glass plate 18 is firmly fixed. Hereinafter, the temporal fixing and the permanent fixing are described with reference to FIG. 3 to FIG. 5B.

Figure 3:
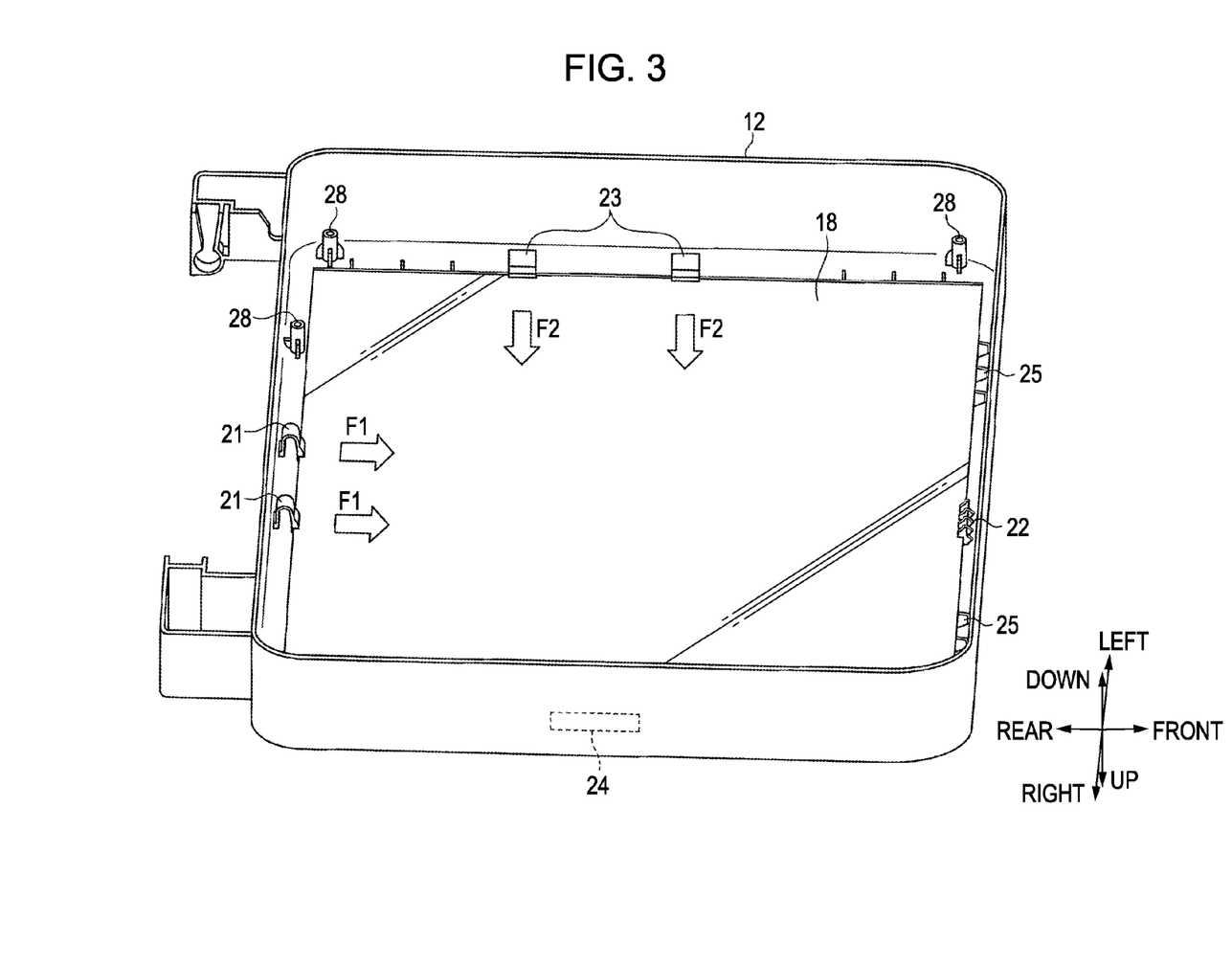
FIG. 3 is a perspective view illustrating a state where the glass plate is temporarily fixed to an upper case of the scanner.

At first, the temporal fixing is described. As illustrated in FIG. 3, in the temporal fixing, the glass plate 18 is inserted between the positioning members 21 and the supporting member 22 and between the positioning members 23 and the supporting member 24 so as to be attached. To be more specific, a front end portion and a right end portion of the glass plate 18 are inserted into spaces between the L shape of the supporting member 22 and the upper case 12 and between the L shape of the supporting member 24 and the upper case 12 in the up-down direction, respectively. Thereafter, the glass plate 18 at the sides of the positioning members 21, 23 are pushed to the side of the upper case 12 while displacing the positioning members 21 and the positioning members 23 to the rear side and the left side, respectively. In this manner, the glass plate 18 is attached.

The positioning members 21 and the positioning members 23 are formed into the hook shapes such that biasing forces which are generated when the glass plate 18 is pushed to the side of the upper case 12 and attached become smaller. Note that the biasing forces are generated when the positioning members 21 and the positioning members 23 are displaced to the rear side and the left side, respectively. This makes it possible to easily push the glass plate 18 to the side of the upper case 12.

In the temporal fixing state where the glass plate 18 has been pushed to the upper case 12 and attached in the above manner, the movement of the glass plate 18 in the up-down direction is restricted by the hook shapes of the positioning members 21, 23 and the L shapes of the supporting members 22, 24. On the other hand, movements of the glass plate 18 in the front-rear and right-left directions are restricted by the hook shapes of the positioning members 21, 23 and positioning wall portions 25 formed on the upper case 12 as illustrated in FIG. 3. The positioning wall portions 25 are formed at both sides of the supporting member 22 provided on the upper case 12 at the front side in the right-left direction, as illustrated in FIG. 3 and are formed at both sides of the supporting member 24 provided on the upper case 12 at the right side in the front-rear direction, although not illustrated. Accordingly, when the glass plate 18 is biased by the positioning members 21, 23, the glass plate 18 abuts against the positioning wall portions 25 so that the position of the glass plate 18 in the front-rear and right-left directions is determined.

Next, the permanent fixing is described. In the permanent fixing, the lower case 13 is assembled on the upper case 12 to which the glass plate 18 has been temporarily fixed in the above manner by screwing the boss engagement portions 38 (see, FIG. 2) provided on the lower case 13 into the fixing bosses 28 (see, FIG. 3) provided on the upper case 12. In the scanner 11 according to the embodiment, when the lower case 13 is assembled, the positioning members 21, 23 are displaced so as to generate the biasing forces F1, F2, as described above. Hereinafter, the displacement is described by taking the positioning members 21 as an example. It is to be noted that the following description is also applicable to the positioning members 23.

Figure 4:
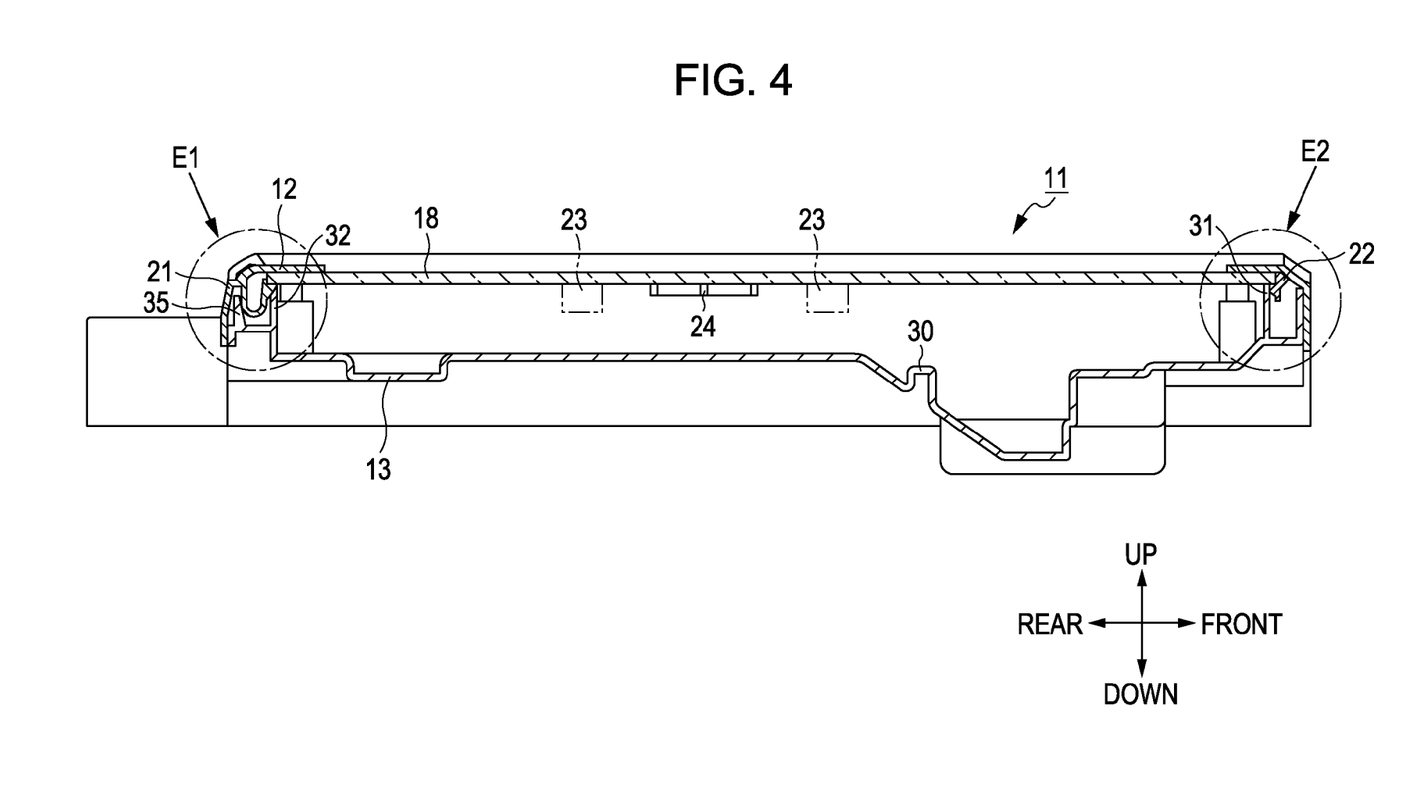
FIG. 4 is a cross-sectional view illustrating a state where a lower case is attached to the upper case.

As illustrated in FIG. 4, the lower case 13 is assembled on the upper case 12 from the lower side to the upper side, for example. As described above, the glass plate 18 is pressed against the upper case 12 by the ribs 31, 32 with the assembling so as to be fixed in the up-down direction. In the embodiment, the glass plate 18 is biased by the positioning members 21 in the front direction so as to be positioned in the direction along the placement face (in this example, front-rear direction) before being fixed in the up-down direction in the above manner. To be more specific, the hook shapes of the positioning members 21 are operated to be displaced in the front direction by an engagement member 35 provided on the lower case 13. The positioning members 21 generate the biasing force F1 acting on the glass plate 18 with the displacement operation of the hook shapes.

Figure 5A:
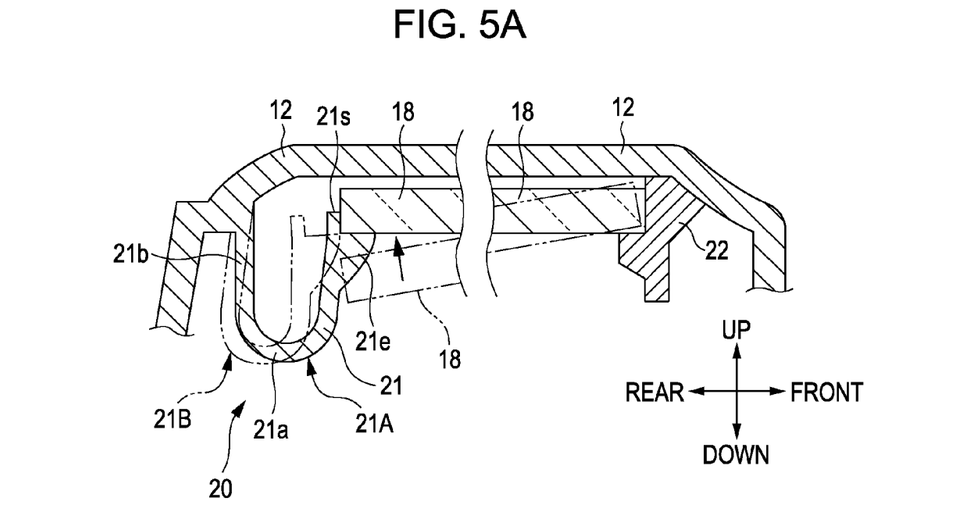
FIG. 5A is a cross-sectional view illustrating a state where the glass plate is temporarily fixed to the upper case.
Figure 5B:
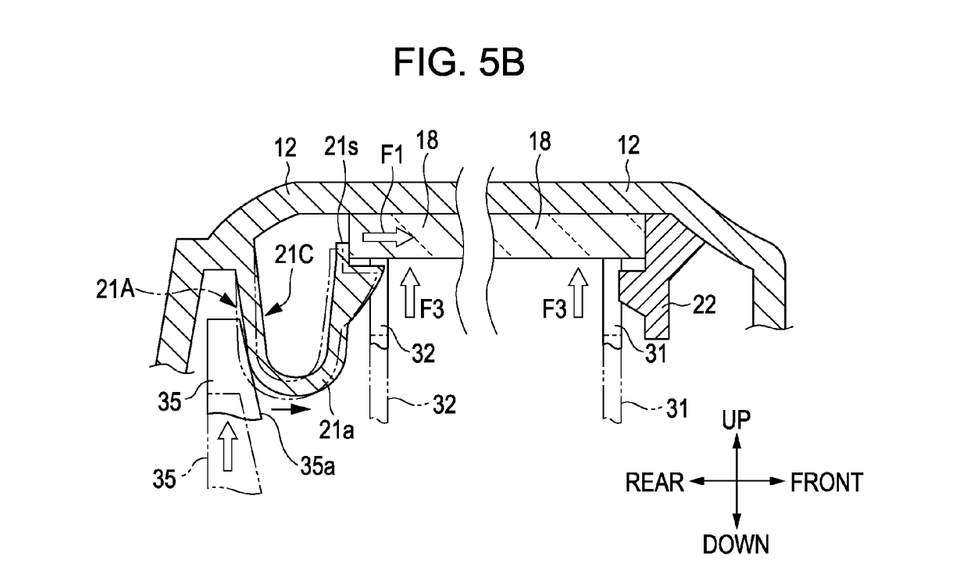
FIG. 5B is a cross-sectional view illustrating a state where the lower case is assembled on the upper case and the glass plate is permanently fixed.

Then, the displacement operation of the positioning members 21 in the temporal fixing and the permanent fixing, that is, the displacement operation of the hook shapes are described in detail together with the hook shapes with reference to FIGS. 5A and 5B. It is to be noted that in FIGS. 5A and 5B, the left side illustrates the region indicated by the arrow E1 in an enlarged manner and the right side illustrates the region indicated by the arrow E2 in an enlarged manner. Further, FIG. 5A illustrates the displacement operation of each positioning member 21 in the temporal fixing and FIG. 5B illustrates the displacement operation of each positioning member 21 in the permanent fixing.

As illustrated in FIG. 5A, each positioning member 21 formed to be integrated with the upper case 12 has a hook-shaped portion 20. A plate-like portion 21b and a curved portion 21a are provided on the hook-shaped portion 20. The plate-like portion 21b is provided so as to extend straightly from the upper side to the lower side. The curved portion 21a is continuous to the plate-like portion 21b and is formed so as to have a predetermined curvature radius. A projecting portion 21e and a locking portion 21s are provided on a front end portion of the hook-shaped portion 20. The projecting portion 21e has a slope shape inclined such that the upper side thereof projects in the front direction. The locking portion 21s has a face in the up-down direction at a position retreated from a terminal end portion of the slope shape of the projecting portion 21e to the rear side. Accordingly, a step having a predetermined width in the front-rear direction is formed between the projecting portion 21e and the locking portion 21s. The positioning members 21, 23 have the hook shapes as described above.

It is to be noted that a material and a shape of each positioning member 21 having the hook shape including the hook-shaped portion 20 are set such that the positioning member 21 can be elastically deformed in a range of a predetermined displacement amount in the front-rear direction. The predetermined displacement amount means a displacement amount in the temporal fixing and the permanent fixing as described in the embodiment, for example.

At first, in the temporal fixing, the projecting portion 21e provided at the front end portion of each hook-shaped portion 20 engages with the glass plate 18 in the front-rear direction and is displaced to the rear side as indicated by a two-dot chain line in FIG. 5A. When it is assumed that each positioning member 21 in a state before being displaced is a positioning member 21A, in the temporal fixing, the positioning member 21A is displaced to a state of a positioning member 21B as indicated by a two-dot chain line in FIG. 5A. Thereafter, when the glass plate 18 has been pushed to the upper case 12 to engage with the projecting portion 21e, the displaced positioning member 21B is returned to the state of the positioning member 21A before the glass plate 18 is attached.

In the embodiment, in the state of the positioning member 21A, the locking portion 21s of the hook-shaped portion 20 does not bias the glass plate 18 (biasing force F1=0). Further, the step (predetermined width) between the locking portion 21s and the projecting portion 21e has a length which is substantially the same as an engagement amount between the projecting portion 21e and the glass plate 18 in the front-rear direction. The engagement amount between the projecting portion 21e and the glass plate 18 in the front-rear direction is set to be the smallest in a range where the glass plate 18 does not drop in the downward direction. In other words, the step between the locking portion 21s and the projecting portion 21e is set to have the smallest predetermined width in a range where the glass plate 18 does not drop in the downward direction. Therefore, the positioning member 21 can be displaced from the state of the positioning member 21A to the state of the positioning member 21B without generating a large biasing force.

If the lower case 13 (not illustrated) is assembled on the upper case 12 from the temporal fixing state, the glass plate 18 is permanently fixed, as illustrated in FIG. 5B. That is to say, the engagement member 35 is provided on the lower case 13 so as to project to the upward direction side (see, FIG. 4). A slope-shaped portion 35a is formed on the engagement member 35. The slope-shaped portion 35a is inclined with respect to the direction (up-down direction) perpendicular to the direction along the placement face of the glass plate 18 (front-rear direction). Further, the engagement member 35 provided on the lower case 13 is arranged at the lower side of the positioning member 21 such that if the engagement member 35 moves in the up-down direction (moves to the upper side from the lower side in FIG. 5B), the slope-shaped portion 35a presses the curved portion 21a to the front side while abutting against the curved portion 21a of the hook-shaped portion 20. Accordingly, the positioning member 21 is displaced in the front direction with the movement (upward movement) of the engagement member 35 so as to be made into a state of a positioning member 21C as indicated by a solid line in FIG. 5B from the state of the positioning member 21A as indicated by a two-dot chain line in FIG. 5B.

If the positioning member 21 is displaced to the state of the positioning member 21C in this manner, the locking portion 21s of the positioning member 21 abuts against the glass plate 18 and is relatively deflected to the rear side because the curved portion 21a is displaced to the front side. Accordingly, the hook-shaped portion 20 (curved portion 21a and the like)

is deformed so that the biasing force F1 is generated. The glass plate 18 is biased in the front direction with the biasing force F1. It is needless to say that adjustment such as increase of the biasing force F1 to be generated, for example, can be made by changing inclination of the slope-shaped portion 35a of the engagement member 35 and changing the displacement amount of the positioning member 21C.

In this manner, the glass plate 18 is positioned in the direction along the placement face thereof (in this example, front-rear direction) with the generated biasing force F1. At the same time, the ribs 31, 32, 33 (the rib 33 is not illustrated in FIGS. 5A and 5B) provided on the lower case 13 move upward and abut against the glass plate 18 which has been positioned in the direction along the placement face thereof. With this, the ribs 31, 32, 33 press the upper face of the glass plate 18 against the upper case 12 with biasing forces F3 so that the glass plate 18 is positioned in the up-down direction.

According to the above embodiment, the following effects can be obtained.

1. When the lower case 13 is assembled on the upper case 12, the positioning members 21, 23 engage with the engagement member 35 to be displaced. With this, the positioning members 21, 23 strongly bias the glass plate 18 in the direction along the placement face thereof so as to position the glass plate 18. Therefore, the glass plate 18 is not required to be positioned on the upper case 12 before the lower case 13 is assembled. Accordingly, the biasing forces F1, F2 acting on the glass plate 18, which are generated by the displacement of the positioning members 21, 23 when the glass plate 18 is attached to the upper case 12, can be made smaller. Therefore, the glass plate 18 can be easily attached. Further, even if the biasing forces F1, F2 which bias the glass plate 18 are not generated by the positioning members 21, 23 before the lower case 13 is assembled, large biasing forces can be generated at the time of the positioning by displacing the positioning members 21, 23. As a result, the scanner 11 in which the glass plate 18 is easily attached to the upper case 12 and a force of fixing the glass plate 18 is sufficiently applied thereto can be provided.

2. The positioning members 21, 23 bias the glass plate 18 with the biasing forces F1 and F2 in accordance with displacement amounts of the hook-shaped portions 20 (curved portions 21a). Accordingly, if the lower case 13 is assembled on the upper case 12, the hook-shaped portions 20 (curved portions 21a) are displaced so that the glass plate 18 can be biased further strongly in accordance with the displacement amounts so as to be positioned.

3. The glass plate 18 can be positioned in the front-rear direction by the positioning members 21. Further, the glass plate 18 can be positioned in the right-left direction by the positioning members 23. As a result, the glass plate 18 can be reliably positioned in the direction along the placement face thereof.

4. The positioning members 21, 23 are formed to be integrated with the upper case 12. Therefore, positions of the positioning members 21, 23 on the upper case 12 are suppressed from being varied. In other words, relative positional deviation of the engagement member 35 and the positioning members 21, 23 which are provided on the lower case 13 to be assembled on the upper case 12 is suppressed. Accordingly, displacement amounts of the positioning members 21, 23 which are displaced by the engagement member 35 are constant. This makes it possible to bias the glass plate 18 with the stable biasing forces F1, F2 which are suppressed from being varied.

Second Embodiment

Next, the second embodiment is described. This embodiment is an embodiment in which the positioning members 21, 23 are provided so as to be separated from the upper case 12 and have shapes other than the hook shapes. The embodiment is different from the above first embodiment only in the configuration relating to the positioning members. Accordingly, hereinafter, only the positioning members are described and other configurations are denoted with the same reference numerals and description thereof is not repeated.

Figure 6A:
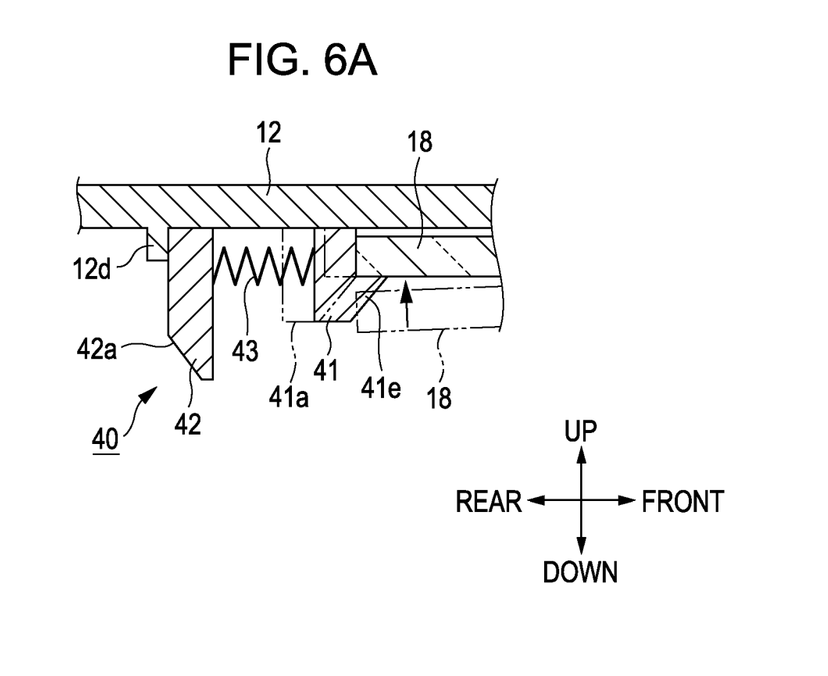
FIG. 6A is a cross-sectional view illustrating a state where the glass plate is temporarily fixed to the upper case.

The embodiment is described with reference to FIGS. 6A and 6B. It is to be noted that FIGS. 6A and 6B correspond to FIGS. 5A and 5B in the above first embodiment. FIG. 6A illustrates a state where the glass plate 18 is temporarily fixed and FIG. 6B illustrates a state where the glass plate 18 is permanently fixed.

As illustrated in FIG. 6A, each positioning member 40 is constituted by a plurality of members which are separated from the upper case 12. That is, the positioning member 40 has a holding member 41, a movement member 42, and an elastic member (for example, coil spring) 43. The holding member 41 supports the glass plate 18 from the lower side and restricts movement of the glass plate 18 to the rear side. Further, a cross-sectional shape of the holding member 41 in the right-left direction is a substantially L shape. The movement member 42 is provided so as to stand in the up-down direction and a slope portion 42a is formed at the lower side of the movement member 42. The elastic member 43 couples the holding member 41 and the movement member 42. Further, slide mechanisms (not illustrated) are formed between the holding member 41 and the upper case 12 and between the movement member 42 and the upper case 12 such that the holding member 41 and the movement member 42 can move with respect to the upper case 12 in the front-rear direction.

In the temporal fixing, a front end portion 41e of the holding member 41 engages with the glass plate 18 in the up-down direction and is displaced to the rear side as indicated by a two-dot chain line in the FIG. 6A. At this time, the elastic member 43 is compressed to bias the movement member 42 to the rear side. However, since the movement member 42 abuts against the locking portion 12d provided on the upper case 12, the movement member 42 does not move to the rear side from the position of the locking portion 12d. Thereafter, when the glass plate 18 has been pushed to the upper case 12 to engage with the front end portion 41e, the holding member 41 is returned to an original state with a biasing force by the elastic member 43. It is to be noted that in the original state, the holding member 41 does not bias the glass plate 18 (biasing force F1=0) and simply restricts movement of the glass plate 18 in the front-rear direction. Further, movement of the glass plate 18 in the downward direction is restricted by the front end portion 41e of the holding member 41 and the supporting member 22 (not illustrated) so that the glass plate 18 does not drop.

Figure 6B:
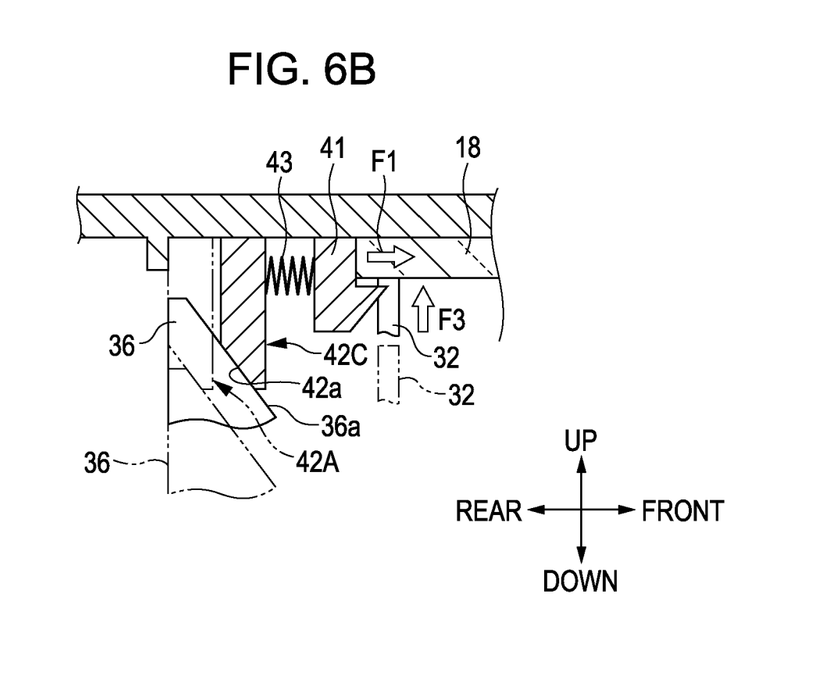
FIG. 6B is a cross-sectional view illustrating a state where the lower case is assembled on the upper case and the glass plate is permanently fixed.

If the lower case 13 (not illustrated) is assembled from the temporal fixing state as described above, the glass plate 18 is permanently fixed, as illustrated in FIG. 6B. That is to say, a slope-shaped portion 36a is formed on an engagement member 36 provided on the lower case 13 (not illustrated). The slope-shaped portion 36a is inclined to the rear side toward the upper side thereof with respect to the direction (up-down direction) perpendicular to the direction along the placement face of the glass plate 18. Further, if the engagement member 36 moves upward to the upper side from the lower side, the slope-shaped portion 36a formed on the engagement member 36 presses the movement member 42 to the front side from the rear side while abutting against the slope portion 42a of the movement member 42. Accordingly, the movement member 42 is displaced in the front direction with the upward movement of the engagement member 36 so as to move from a position of a movement member 42A in the temporal fixing state to a position of a movement member 42C in the permanent fixing state.

If the movement member 42 is displaced from the position of the movement member 42A to the position of the movement member 42C in this manner, the elastic member 43 is compressed and the biasing force F1 in accordance with the displacement amount is applied to the holding member 41. Therefore, the glass plate 18 is biased with the biasing force F1. In other words, adjustment such as increase in the biasing force F1 to be generated, for example, can be made by changing inclination of the slope-shaped portion 36a of the engagement member 36 and adjusting the displacement amount of the movement member 42.

In this manner, the glass plate 18 is positioned in the direction along the placement face (in this example, front-rear direction) with the generated biasing force F1. Further, the ribs 31, 32 provided on the lower case 13 move upward and abut against the glass plate 18 which has been positioned in the direction along the placement face thereof. With this, the ribs 31, 32 press the upper face of the glass plate 18 against the upper case 12 with the biasing forces F3 so that the glass plate 18 is positioned in the up-down direction.

According to the embodiment, the following effects can be obtained in addition to the effects 1, 3 obtained in the above first embodiment.

5. The elastic member 43 can be formed by a member which is different from the upper case 12. Therefore, a magnitude of the biasing force to be generated based on the compression amount (displacement amount) of the elastic member 43 can be adjusted and set by selection of materials and devising of shapes, for example. Accordingly, it becomes easy to form the elastic member 43 such that the holding member 41 is displaced with a small biasing force in the temporal fixing and the holding member 41 is biased with a large biasing force (fixing force), which is necessary in a practical use, by the displacement of the movement member 42 so as to permanently fix the glass plate 18.

It is to be noted that the above embodiments may be changed as follows.

In the above embodiments, at least one of the positioning members 21, 23 may bias the glass plate 18 in the direction along the placement face thereof with a first biasing force in the temporal fixing state and may bias the glass plate 18 with a second biasing force which is stronger than the first biasing force in the permanent fixing.

To be more specific, for example, in the temporal fixing state as illustrated in FIG. 5A, each positioning member 21 is made into a state where the positioning member 21 is not returned to the positioning member 21A, that is, each positioning member 21 is made into a state between the positioning member 21A and the positioning member 21B. With this, the hook-shaped portion 20 thereof is displaced to the rear side in the temporal fixing. Therefore, each positioning member 21 generates the biasing force (first biasing force) so that the locking portion 21s can bias the glass plate 18 in the front direction.

With this configuration, in the temporal fixing state before the lower case 13 is assembled on the upper case 12, the glass plate 18 is positioned in the direction along the placement face thereof with the first biasing force by the displaced positioning members 21, 23. On the other hand, in the permanent fixing state after the lower case 13 has been assembled on the upper case 12, the positioning member 21, 23 which have engaged with the engagement member 35 and have been displaced bias the glass plate 18 in the direction along the placement face thereof with the second biasing force which is larger than the first biasing force. Therefore, the glass plate 18 can be stably positioned. That is to say, if the lower case 13 is assembled on the upper case 12, the positioning members 21, 23 bias the glass plate 18 further strongly so as to position the glass plate 18. As a result, even in a state where a biasing force (fixing force) acting on the glass plate 18 which has been positioned by the positioning members 21, 23 is small before the lower case 13 is assembled, the positioning members 21, 23 can bias the glass plate 18 to the sides of the supporting members 22, 24 strongly with the assembling of the lower case 13. Accordingly, the scanner 11 in which the glass plate 18 is easily attached to the upper case 12 and a force of fixing the glass plate 18 is sufficiently applied thereto can be provided.

In the above embodiments, only one of the supporting member 22 and the supporting member 24 may be provided. With this, when the glass plate 18 is attached to the upper case 12, it is sufficient that an end portion of the glass plate 18 is inserted into a space on any one of supporting members. Therefore, the glass plate 18 is easily attached.

In the above embodiments, magnitudes of the biasing forces F1 by the two positioning members 21, which are generated by the displacement, may be different from each other. In the same manner, magnitudes of the biasing forces F2 by the two positioning members 23, which are generated by the displacement, may be different from each other. In addition, the magnitudes of the biasing forces F1 by the positioning members 21 and the biasing forces F2 by the positioning members 23 may be the same or different from each other. Further, each of the numbers of the positioning members 21 and the positioning members 23 is not limited to two and may be one, or three or more. That is, it is sufficient that the number of the positioning members and the biasing forces thereof are set such that the glass plate 18 can be fixed with a fixing force which is sufficient in a practical use.

In the above embodiments, the scanner 11 may be attached to another apparatus (in this example, printer 100). However, it is needless to say that the scanner 11 may be used as a single unit which is separated from the apparatus. Further, a cover which covers a document placed on the glass plate 18 may be attached to the upper case 12 in a rotatable manner.

The image reading apparatus is not limited to the scanner 11 according to the above embodiments. The invention can be applied to any apparatuses as long as the apparatus has a configuration in which a plate-like transparent member is attached to a housing and an image is read through the transparent member.

The entire disclosure of Japanese Patent Application No: 2010-226647, filed Oct. 6, 2010, is expressly incorporated by reference herein.

What is claimed is:

1. An image reading apparatus which reads an image on a target, the image reading apparatus comprising:
    a first housing;
    a transparent member which is provided on the first housing and has a placement face on which the target is placed;
    a positioning member which positions the transparent member;
    a second housing which is assembled on the first housing and biases the positioning member; and
    an engagement member which is provided on the second housing and engages with the positioning member,
        wherein when the second housing is assembled on the first housing, the engagement member biases the positioning member so as to fix the transparent member to an attachment position, and wherein the positioning member biases the transparent member with a first biasing force before the second housing is assembled on the first housing, and the positioning member biases the transparent member with a second biasing force which is larger than the first biasing force by a displacement when the positioning member engages with the engagement member after the second housing has been assembled on the first housing.

2. An image reading apparatus which reads an image on a target, the image reading apparatus comprising:

a first housing;

a transparent member which is provided on the first housing and has a placement face on which the target is placed;

a positioning member which positions the transparent member;

a second housing which is assembled on the first housing and biases the positioning member; and an engagement member which is provided on the second housing and engages with the positioning member, wherein when the second housing assembled on the first housing, the engagement member biases the positioning member so as to fix the transparent member to an attachment position, and wherein the positioning member has a hook-shaped portion which projects in a direction intersecting with a direction along the placement face and generates a biasing force in accordance with a displacement amount in the direction along the placement face, the engagement member has a slope-shaped portion which is inclined in the direction intersecting with the direction along the placement face, and the positioning member is displaced in the direction along the placement face while the hook-shaped portion abuts against the slope-shaped portion so as to bias the transparent member when the second housing is assembled on the first housing.

3. An image reading apparatus which reads an image on a target, the image reading apparatus comprising:

a first housing;

a transparent member which provided on the first housing and has a placement face on which the target is placed;

a positioning member which positions the transparent member;

a second housing which is assembled on the first, housing and biases the positioning member; and an engagement member which is provided on the second housing and engages with the positioning member, wherein when the second housing assembled on the first housing, the engagement member biases the positioning member so as to fix the transparent member to an attachment position, wherein the transparent member has a rectangular shape; and the positioning member is provided so as to bias two sides of the rectangular shape, which are adjacent to each other, in a direction along opposed sides which are adjacent to each other.

4. The image reading apparatus according to claim 1, wherein the positioning member is formed to be integrated with the first housing.

5. A recording apparatus comprising:

the image reading apparatus according to claim 1, and a recording portion which records image data.

6. The image reading apparatus according to claim 2, wherein the positioning member is formed to be integrated with the first housing.

7. A recording apparatus comprising:

the image reading apparatus according to claim 2, and a recording portion which records image data.

8. The image reading apparatus according to claim 3, wherein the positioning member is formed to be integrated with the first housing.

9. A recording apparatus comprising:

the image reading apparatus according to claim 3, and a recording portion which records image data.

\* \* \* \* \*